United States Patent
Neumann et al.

(10) Patent No.: US 12,266,088 B2
(45) Date of Patent: Apr. 1, 2025

(54) METHOD FOR PRODUCING A CORRECTED IMAGE AND APPARATUS

(71) Applicant: CARL ZEISS MICROSCOPY GMBH, Jena (DE)

(72) Inventors: Markus Neumann, Unterschleißheim (DE); Corinna Sommer, Munich (DE); David Knipp, Brannenburg (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 497 days.

(21) Appl. No.: 17/658,952

(22) Filed: Apr. 12, 2022

(65) Prior Publication Data
US 2022/0335580 A1    Oct. 20, 2022

(30) Foreign Application Priority Data
Apr. 19, 2021   (DE) .......................... 102021203870.0

(51) Int. Cl.
*G06T 5/94*   (2024.01)
*G01N 21/64*   (2006.01)
(Continued)

(52) U.S. Cl.
CPC ............ *G06T 5/94* (2024.01); *G01N 21/6458* (2013.01); *G06T 5/50* (2013.01); *G06T 7/0002* (2013.01);
(Continued)

(58) Field of Classification Search
CPC .............. G01N 21/6458; G02B 21/008; G02B 21/367; G06T 2207/10056;
(Continued)

(56) References Cited

U.S. PATENT DOCUMENTS

| | | | |
|---|---|---|---|
| 11,215,806 B2 * | 1/2022 | Heupel | H04N 23/72 |
| 2009/0040527 A1 * | 2/2009 | Popescu | G01B 9/02087 356/491 |

(Continued)

FOREIGN PATENT DOCUMENTS

| | | | | |
|---|---|---|---|---|
| CN | 110301032 B | * | 2/2021 | G01N 21/01 |
| DE | 102014112002 A1 | | 2/2016 | |

(Continued)

OTHER PUBLICATIONS

Peng, et al., "A Basic Tool for Background and Shading Correction of Optical Microscopy Images", Nature Communications; DOI:10.1038/ncomms14836, Jun. 8, 2017, 7 pages.

*Primary Examiner* — Asghar H Bilgrami
(74) *Attorney, Agent, or Firm* — Brake Hughes Bellermann LLP

(57) ABSTRACT

Corrected images are produced with an apparatus that includes a detector and a control unit. In a first operating mode, a plurality of image tiles of an object are captured as a plurality of image pixels. The control unit generates commands to capture each image, such that it partially overlaps with at least one other image tile in an image tile overlap region having a minimum size. Each captured image tile and/or a resultant image is combined pixel-wise by calculation in a brightness correction image. In a second operating mode, the brightness correction image is produced by capturing a plurality of correction image tiles of the object as a plurality of image pixels, and control commands are generated, so the object is moved relative to a detection beam path and a size of a correction image overlap region is greater than the minimum size of the image tile overlap region.

16 Claims, 3 Drawing Sheets

(51) Int. Cl.
  *G02B 21/00* (2006.01)
  *G02B 21/36* (2006.01)
  *G06T 3/4038* (2024.01)
  *G06T 5/50* (2006.01)
  *G06T 5/92* (2024.01)
  *G06T 7/00* (2017.01)
(52) U.S. Cl.
  CPC .............. *G06T 2207/10056* (2013.01); *G06T 2207/10152* (2013.01); *G06T 2207/30168* (2013.01)
(58) Field of Classification Search
  CPC . G06T 2207/10152; G06T 2207/30168; G06T 3/4038; G06T 5/50; G06T 5/94; G06T 7/0002
  See application file for complete search history.

(56) References Cited

U.S. PATENT DOCUMENTS

2013/0329033 A1* 12/2013 Shibata ................ H04N 23/741
                                                                    348/79
2016/0054551 A1*  2/2016 Heupel .................. G02B 21/06
                                                                    348/80

FOREIGN PATENT DOCUMENTS

ES            2923001 T3 *  9/2022  ........... G02B 21/002
WO    WO-2017109156 A1 *  6/2017  ......... G02B 21/0032

* cited by examiner

METHOD FOR PRODUCING A CORRECTED IMAGE AND APPARATUS

CROSS REFERENCE TO RELATED APPLICATION

This application claims priority to German Application No. 102021203870.0, filed Apr. 19, 2021, the disclosure of which is incorporated by reference herein in its entirety.

TECHNICAL FIELD

This disclosure relates to a method for producing a corrected image and to an apparatus for carrying out the method.

BACKGROUND

Reducing system-related imaging aberrations is very important in many imaging methods, especially in microscopy. By way of example, such imaging aberrations may arise from the effect of the utilized optical elements in the respective beam paths and due to technical reasons as a result of utilized detectors. Additionally, a sample holder, for example, a (cover) slip, an object slide, a base of a Petri dish, or a (micro)titer plate, may contribute to imaging aberrations that are not caused directly by an object (sample) to be imaged.

A correction of brightness differences (shading; shading correction) in captured images is particularly important. By way of example, this is particularly influential if a number of image tiles are captured, which are stitched together to form an overall image. In the process, the individual image tiles overlap one another by a specific area (overlap region; overlap) so that the image tiles can be stitched with positional accuracy on the basis of the multiply captured image information contained therein. If image tiles have different brightnesses, this is perceived as an error by a viewer.

The prior art has disclosed a number of approaches for correcting brightness. In principle, these approaches can be subdivided into two categories: i) reference-based methods and ii) purely computational methods.

The reference-based methods are based on a reference image (also referred to as brightness correction image, correction image below), for example, of a homogeneous sample, which should result in a homogeneous signal. Imaging aberrations that occur regardless are contained in the reference image, and so captured images of a sample can be corrected by virtue of subtracting the reference image therefrom. Numerous procedures are known for the purposes of producing a reference image (e.g., DE 10 2014 112 002 A1).

Instead of a reference image, the purely computational methods use the already captured images of a sample which contain the imaging aberrations. One example of such an approach is offered by the BaSiC tool (Peng et al., 2017) software.

SUMMARY

Reference-based correction methods are intended to be emphasized below.

What are known as camera-based brightness corrections may be implemented as holistic corrections, for example. In the process, a sample holder such as an object slide, for example, is positioned in the beam path such that a region without sample is captured. The optical conditions correspond to those during the sample capture. By way of example, the chosen region contains the same cover slip and embedding medium as the sample. A captured image of this region can subsequently be used as reference image. This procedure is specific to the currently utilized objective lens and is used, in particular, for conventional image capture in transmitted light.

The correction just described can be carried out for each individual channel in multicolor experiments, for example, and in particular finds application in the correction of reflected-light fluorescence recordings.

Modifications of the correction methods described can be applied in many ways. By way of example, it is possible to capture a plurality of image tiles of a sample-free region of the object slide and form a mean value, for example in order to eliminate sample contamination present in the image or in order to compensate variances between the image tiles. This procedure can be implemented in channel-specific fashion.

It is also possible to capture a plurality of image tiles of a sample and determine a reference image therefrom. In this case, the assumption is made that image structures are canceled, for example, within the scope of forming a mean value, and only the information regarding brightness differences remains. This procedure is applied for complicated or complex fluorescence images, in particular, and requires many image tiles, usually more than 200 tiles. This requires an object slide with the desired fluorophore and a sample whose size permits the capture of a sufficient number of image tiles. A channel-specific correction is also possible in this case.

In another variant, the sample is focused on, and the object slide is then removed from the beam path. At least one image of the "free space" is captured and used as a reference image.

Particular challenges arise when correcting fluorescence images in which a sample to be imaged is marked by molecules which are excitable to fluoresce (fluorophores). In this case, inherent structures of the sample should be prevented in a reference image from manifesting in said reference image. Moreover, there should be, if possible, no bleaching during the production of the reference image which could lead to deviations in the optical conditions between the creation of the reference image and the sample capture.

The invention is based on the object of proposing a further option for producing a reference image, by means of which the disadvantages of the prior art are reduced.

The object is achieved by means of a method for producing a corrected image by using an apparatus for image capturing. Furthermore, the invention includes an apparatus for carrying out the method. Advantageous developments are set herein.

An apparatus includes a detection beam path with a detector unit and a control unit for generating control commands. In a first operating mode of the method, a plurality of image tiles of an object that is present in a sample chamber are captured. In this case, each of the image tiles is captured as a plurality of image pixels. Thus, each image tile is composed of a plurality of image pixels (picture elements). In addition, control commands are generated by means of the control unit such that each of the image tiles is captured in a manner such that it partially overlaps with at least one further captured image tile in an image tile overlap region (overlap) of a defined minimum size. A resultant image or overall image is produced by stitching the image tiles. Here, the image data of the multiply captured image pixels of the overlap regions serve for arranging the image tiles at the correct position and with the correct orientation relative to one another. The captured image tiles and/or the resultant image are/is corrected by means of a brightness correction image, wherein each image pixel of the image tiles and/or of the resultant image is combined by calculation with image data from corresponding pixels of the brightness correction image.

A method is characterized in that, in a second operating mode, a reference image is produced as a brightness correction image by capturing a plurality of images of the object in each case as a plurality of image pixels, wherein control commands are generated by means of the control unit such that the object is moved relative to the detection beam path and, in the process, a size of a correction image overlap region is greater than the minimum size of the image tile overlap region.

The relative movement between object and detection beam path can be brought about by means of an adjustable sample stage and/or by pivoting or displacing the detection beam path. The relative movement is advantageously brought about by way of a motor.

The departure from the minimum size of the image tile overlap region can be exploited, at least for the purposes of creating the brightness correction image. In this way, it becomes possible to capture a significantly greater number of different image tiles of a sample than is the case if the minimum size is maintained.

A minimum size of the overlap region that is often applied is 10% of the extent of the image tile in one image direction. It is therefore an advantageous refinement of the method if the control commands serve for controlling a drive unit by means of which the object can be moved and the size of the correction image overlap region in one image direction is selected to be greater than 10% of the extent of the images in said image direction. The correction image overlap region can be, for example, 20%, 30%, 40%, 50%, 60%, 70%, 80% or 90% in one image direction.

To attain a sufficient quality of a brightness correction image to be used in actual fact, a currently available brightness correction image can be analyzed and can be assessed in respect of a quality criterion defined in advance. If the quality criterion is not satisfied, the currently available brightness correction image can be combined by calculation with a further image of the object. Optionally, this step can be repeated until the quality criterion has been satisfied. The variance of the brightness correction image is one possible quality criterion. The objective is to produce a low-variance brightness correction image, in which there therefore is a uniform distribution of brightness intensity values.

It is advantageous in this case to select the size of the correction image overlap region in each case on the basis of the result of the assessment of the quality criterion. In this way, a further brightness correction image can be produced that is very likely going to result in the quality criterion being satisfied.

In principle, the techniques described herein can be used for any microscopy method where contrasts are exploited. Therefore, a sample holder can be chosen as an object, for example, to reduce system-related imaging aberrations. The method can be used particularly advantageously in fluorescence microscopy. A sample having molecules emitting detection radiation to be captured, for example, fluorophores, is chosen as an object in this case.

The relative displacements between the image tiles can be produced incrementally, for example, by appropriately controlling drives of the sample stage. In a further refinement of the method, it is also possible for the images for producing the brightness correction image to be captured with time-limited illumination of the object while the object and/or the sample stage is/are continuously moved. Time-limited illumination can here be realized within the scope of stroboscopic illumination.

Alternatively, for capturing an image, the object is moved by a specific path length to a position specified by way of a control command and is stopped there. At this current position which has been reached, a further image for producing the brightness correction image is captured.

The apparatus for carrying out the method according to the invention serves to capture images of an object present on an adjustable sample stage in a sample chamber and comprises a detection beam path, a detector unit, and a control unit for generating control commands. The control unit is configured to generate control commands. The control commands can be used to execute a first operating mode and a second operating mode.

In the first operating mode, the detector unit and the sample stage are controlled by means of the control commands so as to capture a plurality of image tiles of the object, wherein, after an image tile has been captured, the object is moved relative to the optical axis of the detection beam path by a defined path length that is less than an extent of the captured image tile in the movement direction so that each of the tile images partially overlaps with at least one further captured tile image in a tile image overlap region of a defined minimum size.

In the second operating mode, the sample stage is controlled by means of the control commands so as to move the object, after an image tile has been captured, relative to the optical axis of the detection beam path by a path length that is less than the defined path length of the first operating mode so that a minimum size of a correction image overlap region is greater than the minimum size of the image tile overlap region.

In a further embodiment, stroboscopic illumination is present, which is likewise controllable by means of the control unit.

Therefore, the method may also serve to generate a corrected image. In this case, a plurality of image tiles of an object are captured, wherein each of the image tiles is captured as a plurality of image pixels and each of the image tiles partially overlaps with at least one further captured image tile in an image tile overlap region of a defined minimum size. A resultant image is produced by stitching the image tiles, wherein the image data of the multiply captured image pixels of the overlap regions are used to arrange the tile images at the correct position and with the correct orientation relative to one another. Each captured image tile and/or the resultant image is corrected by means of a brightness correction image, wherein each image pixel of the image tiles and/or of the resultant image is combined by calculation with image data from corresponding pixels of the brightness correction image. Such a method is characterized in that the brightness correction image is produced by capturing a plurality of images of the object in each case as a plurality of image pixels, wherein a minimum size of a correction image overlap region is selected to be greater than the minimum size of the image tile overlap region.

The techniques described herein can potentially be used in all contrast-based microscopy methods, wherein it is particularly suitable for fluorescence microscopy and brightfield microscopy, in particular in the transmitted-light bright field.

BRIEF DESCRIPTION OF THE DRAWINGS

The invention will be explained in more detail below on the basis of drawings. In the figures.

DETAILED DESCRIPTION

Figure 1:
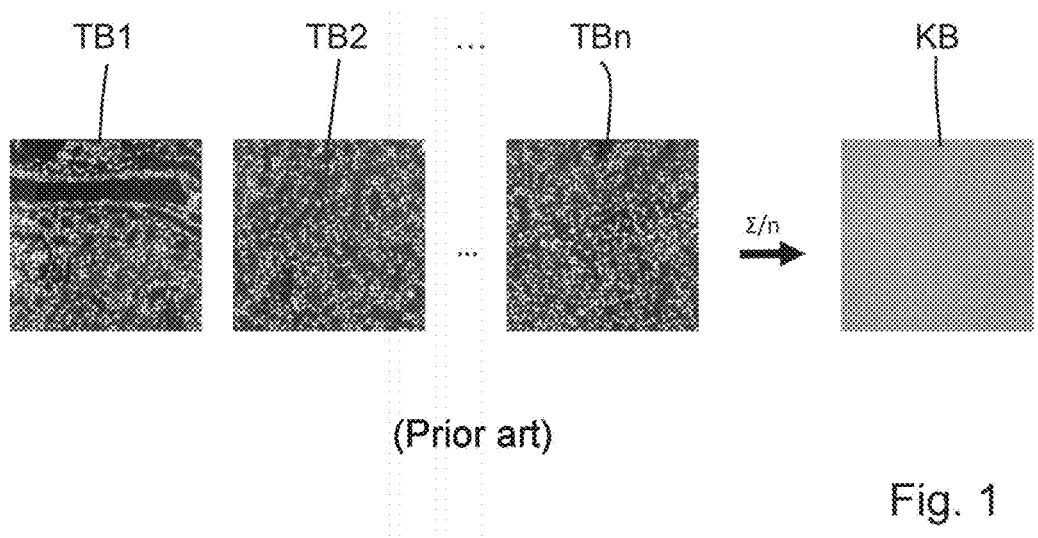
FIG. 1 shows a schematic example of producing a brightness correction image in accordance with the prior art.

A method known from the prior art for producing a brightness correction image KB (also referred to as a correction image KB for short) is illustrated highly schematically in FIG. 1. A number of (correction) image tiles TB1, TB2 to TBn are captured, the respective pixels of the image tiles are combined by applying different mathematical methods optionally to be selected (symbolized by the character sequence: $\Sigma/n$), for example averaging, and this is used to create the correction image KB. It is evident that the correction image KB has a smaller variance in its brightness intensity values and appears more homogeneous than is the case for the first image tile TB1, for example.

Figure 2:
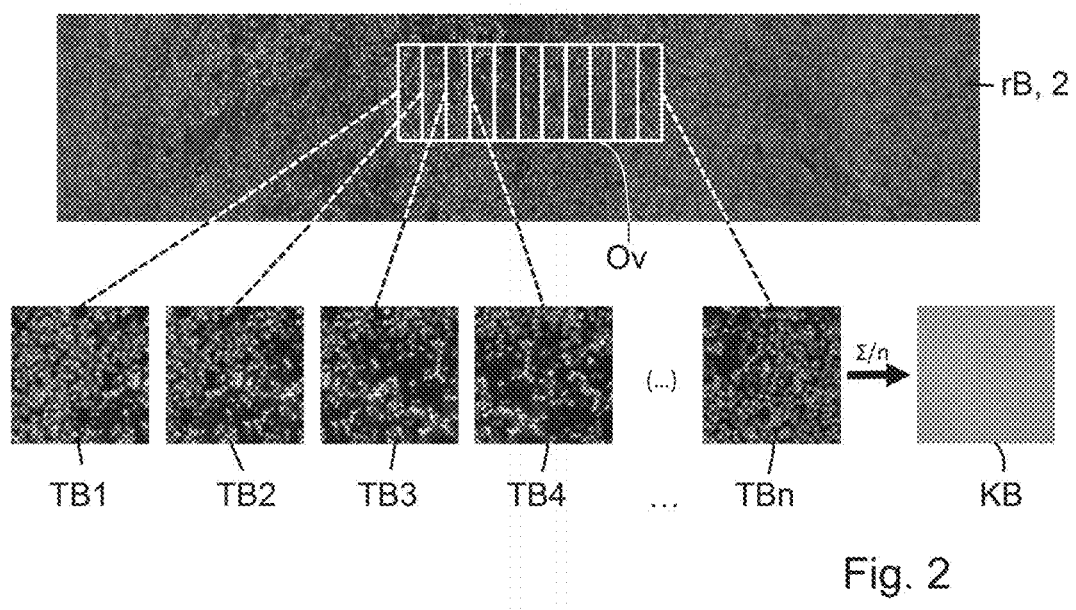
FIG. 2 shows a schematic illustration of a refinement of the method according to the techniques described herein.

A refinement of the method according to the techniques described herein is illustrated in FIG. 2. A resultant image rB, which has been stitched from a plurality of image tiles (not shown) and illustrates a sample 2, is shown merely for explanatory reasons. A first to $n^{th}$ image tile TB1 to TBn, which overlap one another in one of their extents, in the illustrated case in the horizontal image direction, are shown by way of example. The correction image overlap regions Ov (overlap) that arise in the process are shown by way of example. The correction image overlap regions Ov are selected to be greater, in particular, greater than 10%, than would be the case with imaging of the sample 2 for the purpose of producing a resulting image rB. The correction image KB is produced by means of a mathematical method from the image tiles TB1 to TBn that partially overlap one another. In this case, each of the image tiles TB1 to TBn has for example a respective variance with a value ranging from 18 to 80, while the variance of the correction image KB produced is only 3, for example.

Figure 3:
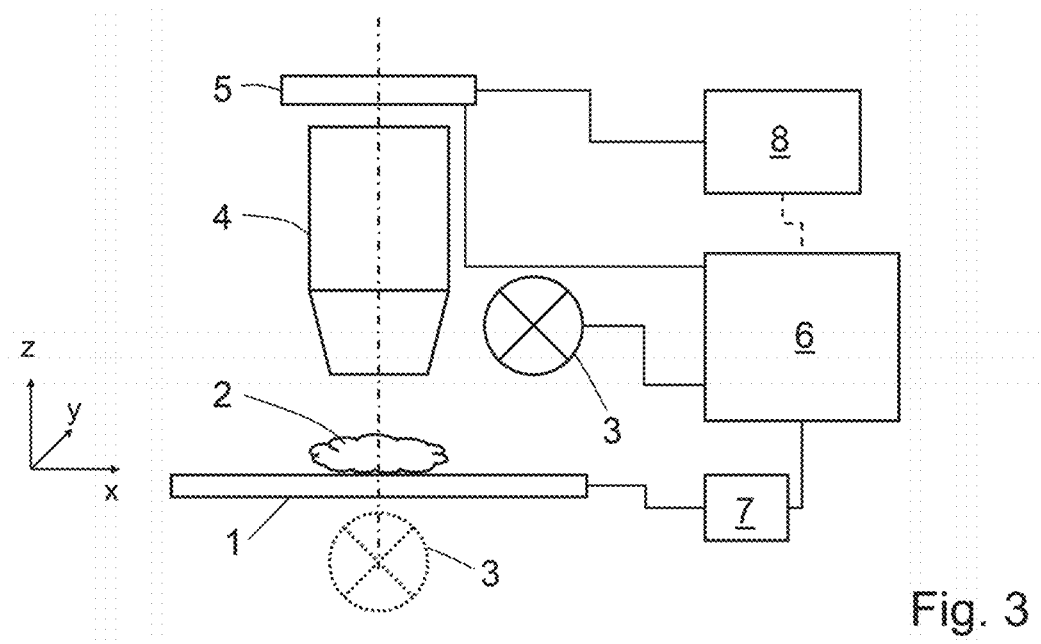
FIG. 3 shows a schematic illustration of an exemplary embodiment of an apparatus according to the techniques described herein.

An exemplary embodiment of an apparatus for carrying out the method according to the invention is illustrated schematically in FIG. 3. A sample 2 can be arranged on a controllably adjustable sample stage 1. Said sample is illuminated by means of a light source 3. Detection radiation emanating from the sample 2, for example, fluorescence radiation and/or reflected components of the illumination radiation, is captured by means of an objective lens 4 and imaged along an optical axis (symbolized by a discontinuous line) onto a spatially resolved detector 5, for example a CCD, CMOS or sCMOS chip, a SPAD (single photon avalanche diode) array or an array of a plurality of PMTs (photomultiplier tubes). The image data captured by means of the detector 5 are transmitted to an evaluation unit 8 and combined there by calculation to form a resultant image rB or a correction image KB.

In alternative embodiments of the apparatus, the illumination can be implemented in transmitted light, that is to say, for example, in the bright field, by means of the light source 3 then positioned appropriately (shown in exemplary and optional fashion using a discontinuous line).

In addition, a control unit 6, which, for example, may be in the form of a computer or of an FPGA and which is configured to generate control commands, is present. The control commands are generated such that the above-described two operating modes are, or can be, executed. The control unit 6 is connected in each case to a drive unit 7 for motor-driven movement of the sample stage 1, to the detector 5, and to the light source 3 in a manner suitable for the transfer of data.

The evaluation unit 8 may be optionally connected to the control unit 6, for example to facilitate an adaptation of the control commands generated there on the basis of the captured image data or on the basis of the degree of fulfillment of selected quality criteria.

LIST OF REFERENCE SIGNS

1 Sample stage
2 Sample, object
3 Light source
4 Objective lens
5 Detector
6 Control unit
7 Drive unit
8 Evaluation unit
TB1, . . . , TBn First image tile, . . . , n-th image tile
Ov (Correction image) overlap region
rB Resultant image/overall image
KB Brightness correction image

The invention claimed is:

1. A method for producing a corrected image by using an apparatus for image capturing, wherein the apparatus has a detection beam path with a detector and a control unit for generating control commands; the method comprising:
    in a first operating mode:
        capturing a plurality of image tiles of an object present in a sample chamber, wherein each of the image tiles is captured as a plurality of image pixels;
        generating control commands with the control unit to cause each of the image tiles to be captured in a manner such that the image tile partially overlaps with at least one further captured image tile in an image tile overlap region of a defined minimum size;
        producing a resultant image by stitching the image tiles, wherein image data of the plurality of image pixels of the overlap regions are used to arrange the tile images at a correct position and with a correct orientation relative to one another; and
        correcting each of the captured image tiles and/or the resultant image by means of a brightness correction image, wherein each image pixel of the image tiles and/or of the resultant image is combined by calculation with image data from corresponding pixels of the brightness correction image; and
    in a second operating mode:
        producing the brightness correction image by capturing a plurality of image tiles of the object in each case as a plurality of image pixels, wherein control commands are generated by the control unit such that the object is moved relative to the detection beam path and a size of a correction image overlap region is greater than the minimum size of the image tile overlap region.

2. The method according to claim 1, wherein the control commands serve for controlling a drive unit by means of which the object can be moved and the size of the correction image overlap region in one image direction is selected to be greater than 10% of an extent of the image tiles in said image direction.

3. The method according to claim 1, further comprising:
   analyzing a currently available brightness correction image in respect of a quality criterion defined in advance; and
   when the quality criterion is not satisfied, combining the currently available brightness correction image by calculation with a further image tile of the object.

4. The method according to claim 3, wherein the size of the correction image overlap region is in each case selected based on the result of an assessment of the quality criterion.

5. The method according claim 1, wherein the object includes a sample holder.

6. The method according to claim 1, wherein the object includes a sample having molecules emitting detection radiation to be captured.

7. The method according to claim 1, further comprising illuminating the object with transmitted light.

8. The method according to claim 1, further comprising capturing the image tiles for producing the brightness correction image with time-limited illumination of the object.

9. The method according to claim 1, further comprising moving the object for capturing an image tile by a specific path length to a position specified by a control command and is stopped there, at which position a further image tile for producing the brightness correction image is captured.

10. An apparatus for capturing images of an object present on an adjustable sample stage in a sample chamber, the apparatus comprising:
    a detection beam path;
    a detector; and
    a control unit configured for generating control commands;
    wherein in a first operating mode, the control unit is configured to:
    generate control commands to control the detector and the sample stage so as to capture a plurality of image tiles of the object, wherein each image tile includes a plurality of image pixels,
       after an image tile has been captured, move the object relative to an optical axis of the detection beam path by a defined path length that is less than an extent of the captured image tile in a movement direction so that each of the tile images partially overlaps with at least one further captured tile image in an image tile overlap region of a defined minimum size,
       produce a resultant image by stitching the image tiles, wherein image data of the plurality of image pixels of the overlap regions are used to arrange the tile images at a correct position and with a correct orientation relative to one another, and correct each of the captured image tiles and/or the resultant image by means of a brightness correction image, wherein each image pixel of the image tiles and/or of the resultant image is combined by calculation with image data from corresponding pixels of the brightness correction image, and
    wherein in a second operating mode, the control unit is configured to:
    generate control commands to control the sample stage so as to move the object, after an image tile has been captured, relative to the optical axis of the detection beam path by a path length that is less than the defined path length of the first operating mode so that a minimum size of a correction image overlap region is greater than the minimum size of an image tile overlap region.

11. The apparatus according to claim 10, further comprising a drive unit, and
    wherein the control unit is configured to generate control commands for controlling the drive unit to move the object,
    wherein the control unit is configured to generate control commands for selecting the size of the correction image overlap region in one image direction to be greater than 10% of an extent of the image tiles in said image direction.

12. The apparatus according to claim 10, wherein the control unit is configured to:
    analyze a currently available brightness correction image in respect of a quality criterion defined in advance; and
    when the quality criterion is not satisfied, combine the currently available brightness correction image by calculation with a further image tile of the object.

13. The apparatus according to claim 12, wherein the size of the correction image overlap region is in each case selected based on the result of an assessment of the quality criterion.

14. The apparatus according claim 10, further comprising a sample holder configured for supporting the object.

15. The apparatus according to claim 10, wherein the sample includes molecules emitting detection radiation to be captured.

16. The apparatus according to claim 10, wherein to capture an image tile, the control unit is configured to move the object by a specific path length to a position specified by a control command, at which position a further image tile for producing the brightness correction image is captured.

* * * * *

UNITED STATES PATENT AND TRADEMARK OFFICE
CERTIFICATE OF CORRECTION

PATENT NO. : 12,266,088 B2
APPLICATION NO. : 17/658952
DATED : April 1, 2025
INVENTOR(S) : Neumann et al.

Page 1 of 1

It is certified that error appears in the above-identified patent and that said Letters Patent is hereby corrected as shown below:

In the Claims

In Column 7, Claim 5, Line 14, after "according" insert --to--.

In Column 8, Claim 14, Line 40, after "according" insert --to--.

Signed and Sealed this
Twenty-seventh Day of May, 2025

Coke Morgan Stewart
*Acting Director of the United States Patent and Trademark Office*